March 29, 1966 J. F. KRUY 3,243,584

ELECTRICAL APPARATUS

Filed July 5, 1963

INVENTOR.
JOSEPH F. KRUY

BY *Fred Jacob*

ATTORNEY

United States Patent Office 3,243,584

Patented Mar. 29, 1966

3,243,584

ELECTRICAL APPARATUS

Joseph F. Kruy, West Newton, Mass., assignor to Honeywell Inc., a corporation of Delaware

Filed July 5, 1963, Ser. No. 293,007

13 Claims. (Cl. 235—175)

Figure 1:
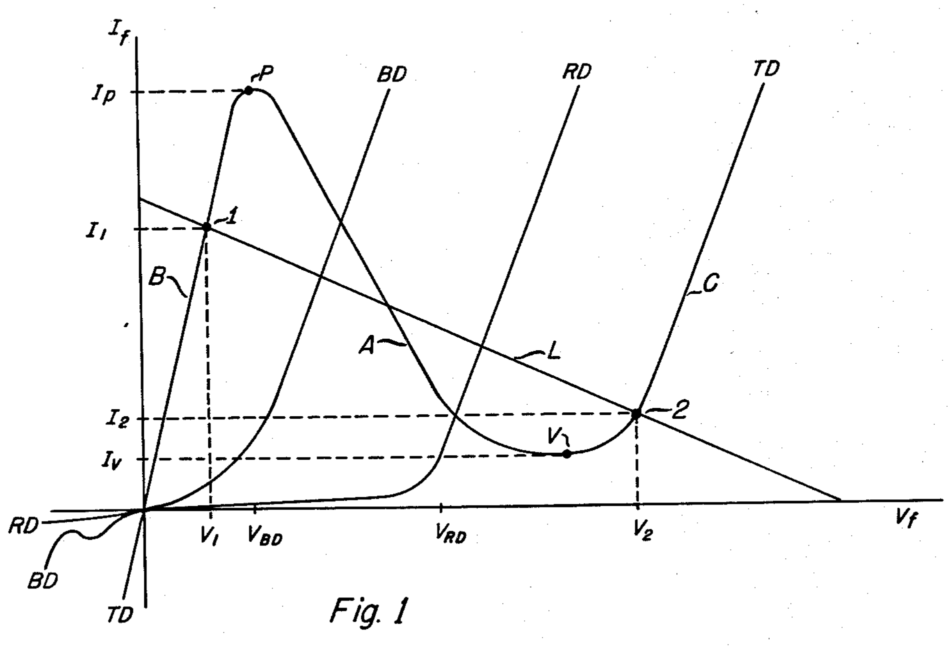

The present invention relates in general to electronic circuitry and in particular to an improved majority logic circuit suitable for forming the carry signal in a binary full adder.

A binary full adder may be described as a device which responds to a plurality of input signals to provide sum and carry output signals in accordance with the rules of binary addition. More specifically, each adder stage includes a sum circuit and a carry circuit, each of which receive the like-ordered augend and addend input signals of a pair of multi-digit binary characters, together with the carry signal formed by the next lower-order adder stage. Sum and carry output signals are formed in each stage according to the Boolean equation:

$$S_j=\overline{A}_j\overline{B}_jC_{j-1}+A_j\overline{B}_j\overline{C}_{j-1}+\overline{A}_jB_j\overline{C}_{j-1}+A_jB_jC_{j-1}$$

and $$C_j=\overline{A}_jB_jC_{j-1}+A_j\overline{B}_jC_{j-1}+A_jB_j\overline{C}_{j-1}+A_jB_jC_{j-1}$$

where $S_j$=Sum output signal of the *j*th adder stage $C_j$=Carry output signal of the *j*th adder stage $C_{j-1}$=Carry output signal of *j*—*l*th adder stage $A_j$=*j*th order augend input signal $B_j$=*j*th order addend input signal.

Since each full adder stage requires the presence of carry information from the preceding stage, the addition of multi-digit augend and addend characters cannot be assuredly completed until sufficient time has elapsed to allow a possible porpagation of a carry signal through each of the successively higher-order adder stages. For this reason, various attempts have been made to decrease the propagation time through the cascaded carry circuits, or carry chain, most frequently, by incorporating high-speed logic devices within each carry circuit. One such device recently used in carry circuits is the tunnel diode. The tunnel diode is adapted to be switched from a low to a high stable voltage level upon the simultaneous application of a majority of its input signals, i.e., in accordance with the carry signal Boolean equation for $C_j$ set forth above. The high voltage level of the tunnel diode forms the carry output signal, which signal is directly applied to the subsequent carry circuit of the carry chain.

Carry circuits of this type have proven to be marginal in operation because of variations in the high voltage level of the tunnel diode. This occurs because of an inability to control the parameters of a tunnel diode accurately in its carrier injection region. The parameters are found to differ considerably between tunnel diodes of the same type and to vary adversely with temperature. If, because of such variations, the high voltage level of the tunnel diode is less than anticipated, a signal simultaneously applied to the augend or addend input signal terminals may not be sufficient to activate the carry circuit, and a carry signal is inadvertently lost. On the other hand, if the high voltage level of the tunnel diode is greater than that anticipated, it may be sufficient, of itself, or in combination with small noise signal variations on either the augend or addend input terminals, to activate the carry circuit and provide an erroneous carry signal.

It is therefore an object of the present invention to provide an improved high-speed carry circuit for a binary full adder.

It is another object of the present invention to provide a carry chain capable of high-speed operation.

It is a further object of the present invention to provide cascaded tunnel diode carry circuits wherein the operation of a carry circuit is not affected by variations in the parameters of the tunnel diode storage device of the previous carry circuit.

Yet another object of the present invention is to provide a new and improved tunnel diode logic circuit.

In the present invention, each carry circuit includes a tunnel diode which is switched from a first to a second stable conductive state upon the application of a majority of its input signals. The increased voltage across the tunnel diode forms its carry output signal. Unlike prior art circuits of this type however, the carry output signal formed across the tunnel diode is not applied directly to the tunnel diode of the following carry circuit to form its carry input signal. Instead, the tunnel diodes of adjacent carry circuits are interconnected by a pair of diodes connected in series opposition for forward current flow therethrough. These diodes are selected to have different conduction characteristics whereby the presence of a carry output signal causes a current of known value applied at the junction of the diodes to be directed to the following tunnel diode as its carry input signal. It is therefore possible with the present invention to provide a carry circuit which utilizes the increased switching speeds of the tunnel diode while at the same time avoiding problems encountered due to variations of its operating parameters.

In addition to performing the majority logic function required for the carry circuit of a full adder, the present invention is useful for performing AND gate or OR gate logic. The presence of oppositely poled diodes between the tunnel diodes of cascaded logic circuits, enables the circuit to perform multilevel gate logic. Each logic circuit not only receives an input signal of well-defined amplitude but a signal of proper polarity for its operation.

Figure 2:
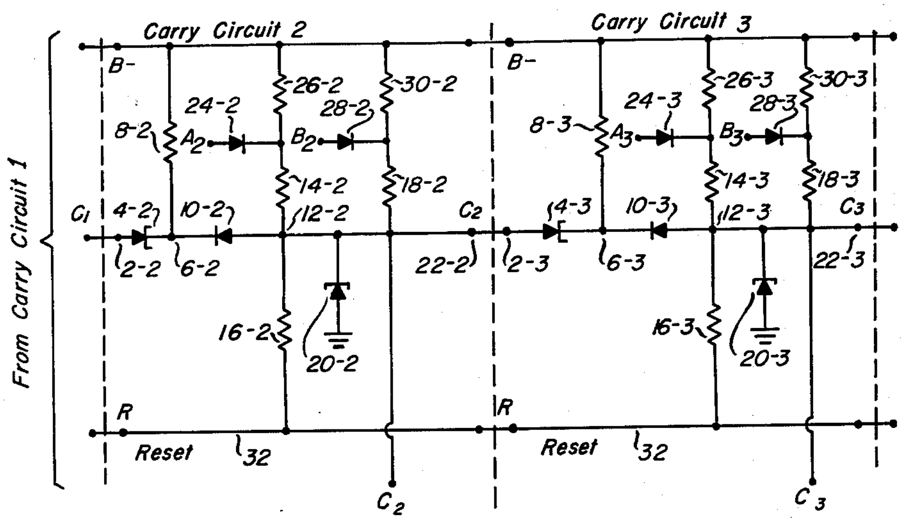

The various novel features which characterize the invention are particularly pointed out in the claims annexed to and forming a part of the specification. For a better understanding of the invention, its advantages and specific objects thereof, reference should be had to the following detailed description and the accompanying drawing in which:

FIGURE 1 illustrates the current-voltage characteristic curves of the semiconductor devices employed in the present invention; and FIGURE 2 is a diagrammatic representation of a preferred embodiment of the present invention.

In describing the operation of the preferred embodiment of the invention shown in FIGURE 2, the reference will occasionally be made to the semiconductor characteristic curves illustated in FIGURE 1. The curve labeled TD in FIGURE 1, for instance, is a representation of the voltage-current response of a tunnel diode for values of forward biasing potenial. It will be noted from this curve that the tunnel diode has a negative resistance region A separated from a pair of positive resistance regions B and C by a pair of current instability points P and V respectively. A proper selection of biasing voltage and series resistance provides a load line L which intersects each of the positive resistance regions, such as at the stable operating points 1 and 2.

When the tunnel diode is set to the operating point 1, there exists a quiescent voltage $V_1$ across it and quiescent current $I_1$ therethrough. If an additive current, or a combinations of additive currents, is momentarily supplied to the tunnel diode which, in combination with the quiescent current $I_1$, is sufficient to exceed the instability current $I_p$, the operating point of the tunnel diode will shift instantaneously to the positive resistance region C. Upon termination of the additive current pulse or pulses, the operating point of the tunnel diode will settle at the stable operating point 2. A larger voltage $V_2$ now exists across the tunnel diode, while a much smaller current $I_2$ flows through it.

A subsequent reduction in current through the tunnel diode which decreases the current through the diode below the instability current $I_v$, will thereafter cause its operating point to revert to the positive resistance region B at the stable operating point 1. As previously stated, the characteristic curve of the tunnel diode in its carrier injection region, i.e. in the valley region about point V, varies considerably between units of the same type and also with aging and ambient temperature. As a result, the voltage $V_2$ cannot be accurately predicted.

The forward conduction characteristic curves of a conventional rectifier diode RD and a backward diode BD have been superimposed on the characteristic curve of the tunnel diode in order to best show their relative forward conduction characteristics. It will be seen that the rectifier diode RD exhibits a high impedance for small values of forward biasing potential. As the forward biasing potential is increased however, a point is reached where its impedance changes abruptly to a low value. The voltage at which the impedance of the diode undergoes a marked impedance change is commonly referred to as its conduction threshold voltage.

The backward diode BD, on the other hand, is a diode which exhibits a low value of impedance at relatively small values of forward biasing potential. Consequently, a much smaller voltage drop is observed across the backward diode than observed across the rectifier diode at equivalent values of current therethrough. For example, the current required to reach the conduction threshold voltage $V_{RD}$ of the rectifier diode provides a much smaller voltage drop $V_{BD}$ across the backward diode. The differences in the conduction characteristics of the rectifier diode and backward diode will be seen to play an important part in the operation of the invention.

Referring now to the preferred embodiment of the invention, FIGURE 2 shows the serially connected carry circuits of a pair of binary full adder stages. Since the individual carry circuits are identical in construction and operation, similar prefix numerals have been used to designate like-positioned components in each circuit. Suffix numerals are used to identify the particular carry circuit in which the component is located.

Each carry circuit comprises an input terminal 2 to which the carry signal formed by the previous carry circuit is applied. The carry signal input terminal 2—2 of the carry circuit 2, for instance, receives the carry signal $C_1$ formed by a previous carry circuit 1. Similarly, the carry signal input terminals 2–3 of the carry circuit 3, receives the carry signal $C_2$ formed by the carry circuit 2. In each stage, a backward diode 4 has its anode connected to the carry signal input terminal 2 and its cathode connected to a junction point 6, the latter further joining one end of a resistor 8 and the cathode of a rectifier diode 10. The other end of resistor 8 is connected to a negative biasing source B— while the anode of the rectifier diode 10 is connected to a junction 12 which connects one end of a resistor 14, one end of a resistor 16, one end of a resistor 18, the cathode of a tunnel diode 20 and a carry signal output terminal 22. The output terminal 22 of each circuit is connected to the carry signal input terminal 2 of the succeeding carry circuit and is also connected to the sum circuit of the next higher-order adder stage.

The other end of resistor 14 is connected to the cathode of a diode 24 and to one end of a resistor 26. The other end of resistor 18 is connected to the cathode of a diode 28 and one end of a resistor 30. The free ends of resistors 26 and 30 are each connected to the aforementioned B— source, while the anodes of the diodes 24 and 28 are connected to the augend and addend input terminals A and B respectively. The free end of the resistor 16 is connected to a common reset line 32.

In order to best describe the operation of the carry chain of FIGURE 2, it will be initially assumed that each tunnel diode has been switched to its low voltage positive resistance region. This is accomplished by applying a positive-going reset pulse to the reset line 32, whereby the current through each tunnel diode is momentarily reduced to a value below its instability current $I_v$. It will be further assumed that binary "zero" input signals are present at the augend and addend input terminals of each carry circuit. In the preferred embodiment, a binary "zero" signal is defined as a signal approximating ground potential.

At this point it is helpful to examine the paths for quiescent current through the tunnel diodes 20–2 and 20–3. Since the terminals $A_2$, $B_2$ and $A_3$, $B_3$ are at ground potential, the diodes 24 and 28 will conduct current via paths which include the resistors 26 and 30 respectively and the B— source. The voltage at their cathodes will therefore approach ground potential. Consequently, there will be no appreciable current for either tunnel diode via the resistors 26 or 30 and the B— source. There exists however, a current path for the tunnel diode 20–2, through the backward diode 4–3, resistor 8–3 to the B— terminal of the subsequent carry circuit 3. Resistor 8–3 and the B— source are selected to provide the load line L and the quiescent current $I_1$, shown in FIGURE 1, through the tunnel diode 20–2, to develop a stable voltage $-V_1$ thereacross. The voltage at the junction 6–3 at this time is the sum of the voltage drop $-V_1$ across the tunnel diode 20–2 and the voltage drop $-V_{BD}$ across the backward diode 4–3, or $-(V_1+V_{BD})$ volts. Since the voltage drop across the tunnel diode 20–3 at this time is also $-V_1$ volts, the rectifier diode 10–3 will remain in the high impedance region of its forward conduction curve and no substantial current will flow therethrough. This is the case since the voltage required to exceed the conduction level of the rectifier diode 10–3 is $-(V_1+V_{RD})$ volts, where $V_{RD}$ is necessarily greater than the voltage $-V_{BD}$. The tunnel diode of each carry circuit therefore receives its quiescent biasing current $I_1$ only via the backward diode 4 and resistor 8 of the following carry circuit.

It will next be assumed that binary "one" signals, or signals of a substantial negative voltage, are present at the augend and addend signal input terminals $A_2$ and $B_2$ respectively. The aforementioned negative signals will provide sufficient additional forward current through the tunnel diode 20–2 to cause the latter to switch to its high voltage stable state, shown by the point 2 of FIGURE 1. A voltage $-V_2$ now exists across the tunnel diode 20–2.

The switching of the tunnel diode 20–2 to its high voltage state will cause the voltage at the junction 6–3 to attempt to rise to a value $-(V_2+V_{BD})$ volts. But this voltage is much greater than that required to exceed the conduction threshold level of the rectifier diode 10–3, which occurs at $-(V_1+V_{RD})$ volts. Upon reaching $-(V_1+V_{RD})$ volts, the current which previously flowed through the backward diode 4–3 will be diverted to flow through the rectifier diode 10–3 and tunnel diode 20–3. The voltage at the junction 6–3 is held at $-(V_1+V_{RD})$ volts and the backward diode 4–3 is reverse biased whereby no appreciable current flows through it. The diversion of current through the rectifier diode 10–3 forms the carry output signal of the carry stage 2.

It should be mentioned at this point that the additional current through the tunnel diode 20–3 via the rectifier diode 10–3 is a function of the value of the B— source and the series resistor 8–3, and is not determined by the voltage $-V_2$ across the tunnel diode 20–2. The parameters of the B— source and resistor 8–3 can be maintained within close tolerances to form a well-defined current through the rectifier diode 10–3. The increased voltage level across the tunnel diode 20–2 merely acts to divert this well-defined current to the subsequent tunnel diode 20–3.

If, when current is diverted to flow through the tunnel diode 20–3, there exists a binary "one" signal level at either the augend terminal $A_3$ or the addend terminal $B_3$ of carry stage 3, there will be a sufficient cumulative current through the tunnel diode 20–3 to switch the latter to its high voltage state. Now, the voltage across the tunnel diode 20–3 becomes $-V_2$ volts and forms a carry signal $C_3$ for a subsequent carry circuit, in the manner described above. Since each of the tunnel diodes 20–2 and 20–3 now have a voltage $-V_2$ thereacross, and the backward diode 4–3 has a lower conduction level than the rectifier diode 10–3, the switching current will revert back to the path which includes the tunnel diode 20–2 and the backward diode 4–3. Once the switching of the tunnel diode 20–3 has taken place, however, the additional switching current through the rectifier diode 10–3 is no longer required for proper circuit operation. The carry circuits may be subsequently reset by means of a positive resetting pulse applied to the reset line 32, to enable them to perform a further addition of applied binary signals.

Unlike prior art circuits where the voltage drop across a tunnel diode becomes the carry signal for the subsequent carry circuit, applicant's invention merely utilizes the switching of the tunnel diode to its high voltage state to direct a well-defined current pulse to the subsequent carry circuit. Each carry circuit of a carry chain therefore receives a carry input signal of well-defined parameters. It should be further noted that there is no signal inversion within a carry circuit. Moreover, the output signal levels from a carry circuit are of the proper amplitude for direct application to a subsequent carry circuit of similar design. For this reason, carry circuits may be cascaded or serially connected, without interposing signal inversion devices or voltage level shifting devices which necessarily add to the carry chain complexity and time response.

Various changes may obviously be made in the parameters employed without departing from the scope of the present invention. Similarly, substitutions and equivalents for some of the circuit components presently employed will readily occur to those skilled in the art. For example, the addend and augend input signals are seen to be applied to the tunnel diodes via gating diodes and resistor divider networks in order to provide a noise threshold level which prevents small fluctuations of the voltages on the augend and addend input lines from adversely affecting circuit operation. Such noise threshold circuits, although useful, are not an essential part of applicant's invention. If desired, the augend and addend input signals may be resistively coupled to the carry circuit tunnel diode.

In each carry circuit described above, the backward diode 4 may, under proper conditions, be replaced by a conventional rectifier diode. Under these conditions, the replacement diode must have a conduction threshold voltage $V_C$ which is less than the conduction threshold voltage $V_{RD}$ of the diode 10. While the use of a pair of conventional rectifier diodes having different conduction threshold levels for directing current is shown by J. J. Eachus in Patent No. 2,986,652, which is assigned to the assignee of the present invention, the circuit disclosed in that patent is, however, far less suitable for majority logic, such as is required by the carry circuit of a full adder. It is, moreover, slower in operation than the circuit disclosed hereinabove. These differences are attributable to the use of tunnel diodes in the present invention wherein the stable voltage levels $V_1$ and $V_2$ assure that the voltage $-(V_2+V_C)$ is greater than the voltage $-(V_1+V_{RD})$.

The tunnel diode logic circuit of the present invention is further useful for performing gating functions other than the majority gating function required for the carry circuit of a full adder. By changing the value of the switching currents which are applied to the tunnel diode, OR gate or AND gate operation can be provided, such that a predetermined number of the applied input signals will cause the cumulative current through the tunnel diode to be sufficient to cause it to switch to its high voltage state. It is therefore possible to utilize the present invention to perform multilevel gate logic where the output of a first gate circuit provides a well-defined input signal for a subsequent gate circuit of similar design. As previously mentioned, it is not necessary to interpose signal inversion devices between the gate circuits, or to alternate the polarity of the gate input signals of adjacent gate circuits, as was the case in prior art circuits.

While, in accordance with the provisions of the statutes, there have been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. A carry circuit for a full binary adder comprising a carry signal input terminal, augend and addend signal input terminals, a tunnel diode having an anode and a cathode, said anode being connected to ground, a back ward diode having its anode connected to said carry signal input terminal and its cathode connected to a junction point, a rectifier diode having its cathode connected to said junction point and its anode connected to the cathode of said tunnel diode, a resistor connected between said junction point and a negative biasing source, means for resistively coupling said augend and addend signal input terminals to the cathode of said tunnel diode, a carry signal output terminal connected to the cathode of said tunnel diode, and means for resistively coupling a reset signal to the cathode of said tunnel diode to switch the latter to a first stable conductive state, said tunnel diode being adapted to switch to a second stable conductive state upon the simultaneous occurrence of input signals on at least two of said input signal terminals.

2. A carry circuit for a full adder comprising first and second diodes, said diodes having their like-poled terminals coupled to a first junction point, said first diode having a lower conduction threshold than said second diode, means for coupling a bias potential to said first junction point, means for coupling a carry input signal to the free terminal of said first diode, a second junction point coupled to the free terminal of said second diode, a tunnel diode coupled between said second junction point and a reference potential point and being poled to receive forward current therethrough from said second diode, means for coupling a reset signal to said second junction point adapted to switch said tunnel diode to a first stable conductive state, means for coupling an addend and an augend input signal to said second junction point, said tunnel diode being adapted to switch to a second stable conductive state upon the simultaneous application of a majority of said input signals, and means for deriving a carry output signal from said second junction point.

3. The apparatus of claim 2 wherein said means for coupling said addend and augend input signals respectively comprise a resistor network connected between said bias coupling means and said second junction point, and a diode adapted to couple the corresponding input signal to said resistor network.

4. A carry circuit comprising a carry signal input terminal, augend and addend signal input terminals, a tunnel diode having an anode and a cathode, said anode being coupled to a reference point, a first diode having its anode connected to said carry signal input terminal and its cathode connected to a junction point, a second diode having its cathode connected to said junction point and its anode connected to the cathode of said tunnel diode, means for resistively coupling to a negative biasing voltage to said junction point, means for resistively coupling said augend and addend signal input terminals to the cathode of said tunnel diode, a carry signal output terminal connected to the cathode of said tunnel diode, and means for coupling a reset signal to the cathode of said tunnel diode.

5. A carry circuit for a full binary adder comprising a carry signal input terminal, augend and addend signal input terminals, a tunnel diode having an anode and a cathode, said anode being connected to ground, a backward diode having its anode connected to said carry signal input terminal and its cathode connected to a junction point, a rectifier diode having its cathode connected to said junction point and its anode conconnected to the cathode of said tunnel diode, a resistor connected between said junction point and a negative biasing source, first and second resistor divider networks connected between said negative biasing source and the cathode of said tunnel diode, first and second diode means having their anodes connected to said augend and addend input signal terminals respectively and their cathodes connected to said first and second resistor divider networks respectively, a carry signal output terminal connected to the cathode of said tunnel diode, and means for resistively coupling a reset signal to the cathode of said tunnel diode to switch the latter to a first stable conductive state, said tunnel diode being adapted to switch to a second stable conductive state upon the simultaneous occurrence of input signals on at least two of said input signal terminals.

6. A logic circuit comprising a first signal input terminal, a tunnel diode having an anode and a cathode, said anode being connected to ground, a first diode having its anode connected to said first signal input terminal and its cathode connected to a junction point, a second diode having its cathode connected to said junction point and its anode connected to the cathode of said tunnel diode, said second diode having a conduction threshold greater than the conduction threshold of said first diode, means for resistively coupling said junction point to a negative biasing terminal, means for resistively coupling further input signal terminals to the cathode of said tunnel diode, an output signal terminal connected to the cathode of said tunnel diode, and means for resistively coupling a reset signal to the cathode of said tunnel diode to switch the latter to a first stable conductive state, said tunnel diode being adapted to switch to a second stable conductive state upon the simultaneous application of input signals on a predetermined number of said input signal terminals.

7. A logic circuit comprising first and second diodes, said diodes having their like-poled terminals coupled to a first junction point, said first diode having a lower conduction threshold than said second diode, means for resistively coupling a bias potential to said first junction point, means for coupling an input signal to the free terminal of said first diode, a second junction point coupled to the free terminal of said second diode, a tunnel diode coupled between said second junction point and a reference potential point and being poled to receive forward current therethrough from said second diode, means for resistively coupling a reset signal to said second junction point adapted to switch said tunnel diode to a first stable conductive state, and means for coupling additional input signals to said second junction point, said tunnel diode being adapted to switch to a second stable conductive state upon the simultaneous application of a predetermined number of said input signals.

8. A logic circuit comprising first and second oppositely poled diodes coupled to a first junction point, said first diode having a lower conduction threshold than said second diode, means for coupling a bias potential to said first junction point, means for coupling an input signal to the free terminal of said first diode, a second junction point coupled to the free terminal of said second diode, a tunnel diode coupled between said second junction point and a reference potential point and being poled in the same direction as said second diode, means for coupling a reset signal to said second junction point adapted to switch said tunnel diode to a first stable conductive state, and means for coupling additional input signals to said second junction point, said tunnel diode being adapted to switch to a second stable conductive state upon the simultaneous application of a predetermined number of said input signals.

9. A logic circuit comprising first and second oppositely poled diodes coupled to a first junction point, said first diode having a lower conduction threshold than said second diode, means for coupling a bias potential to said first junction point, means for coupling an input signal to the free terminal of said first diode, a second junction point coupled to the free terminal of said second diode, a tunnel diode coupled between said second junction point and a reference potential point and being poled in the same direction as said second diode, and means for coupling a reset signal to said second junction point adapted to switch said tunnel diode to a first stable conductive state, said tunnel diode being adapted to switch to a second stable conductive state upon the application of an input signal of a predetermined polarity to said first diode.

10. A logic circuit comprising first and second diodes, said diodes having their like-poled terminals coupled to a first junction point, said first diode having a lower conduction threshold than said second diode, means for resistively coupling a basis potential to said first junction point, means for coupling an input signal to the free terminal of said first diode, a second junction point coupled to the free terminal of said second diode, a tunnel diode coupled between said second junction point and a reference potential point and being poled to receive forward current therethrough from said second diode, and means for resistively coupling a reset signal to said second junction point adapted to switch said tunnel diode to a first stable conductive state, said tunnel diode being adapted to switch to a second stable conductive state upon the application of an input signal of a predetermined polarity to said first diode.

11. A logic circuit comprising a signal input terminal, a tunnel diode having an anode and a cathode, said anode being connected to ground, a first diode having its anode connected to said first signal input terminal and its cathode connected to a junction point, a second diode having its cathode connected to said junction point and its anode connected to the cathode of said tunnel diode, said second diode having a conduction threshold greater than the conduction threshold of said first diode, means for resistively coupling said junction point to a negative biasing terminal, an output signal terminal connected to the cathode of said tunnel diode, and means for resistively coupling a reset signal to the cathode of said tunnel diode to switch the latter to a first stable conductive state, said tunnel diode being adapted to switch to a second stable conductive state upon the application of a negative-going signal to said input signal terminal.

12. A logic circuit comprising a first signal input terminal a tunnel diode having an anode and a cathode, said anode being connected to ground, a backward diode having its anode connected to said first signal input terminal and its cathode connected to a junction point, a rectifier diode having its cathode connected to said junction point and its anode connected to the cathode of said tunnel diode, a resistor connected between said junction point and a negative biasing source, means for coupling further input signal terminals to the cathode of said tunnel diode, an output signal terminal connected to the cathode of said tunnel diode, and means for resistively coupling a reset signal to the cathode of said tunnel diode to switch the latter to a first stable conductive state, said tunnel diode being adaped to switch to a second stable conductive state upon the simultaneous occurrence of input signals on a predetermined number of said input signal terminals.

13. A carry chain for a binary full adder comprising a plurality of serially connected carry circuits each having a carry signal input terminal, augend and addend signal input terminals, a tunnel diode having an anode and a cathode, said anode being connected to ground, a backward diode having its anode connected to said carry signal input terminal and its cathode connected to a junction point, a rectifier diode having its cathode connected to said junction point and its anode connected to the cathode of said tunnel diode, a resistor connected between said junction point and a negative biasing source, first and second resistor divider networks connected between said negative biasing source and the cathode of said tunnel diode, first and second diode means having their anodes connected to said augend and addend input signals respectively and their cathodes connected to said first and second resistor divider networks respectively, a carry signal output terminal connected to the cathode of said tunnel diode, and means for resistively coupling a reset signal to the cathode of said tunnel diode to switch the latter to a first stable conductive state, said tunnel diode being adapted to switch to a second stable conductive state upon the simultaneous occurrence of input signals on at least two of said input signal terminals.

No references cited.

ROBERT C. BAILEY, *Primary Examiner.*

G. D. SHAW, *Assistant Examiner.*